(12) United States Patent
Murphy

(10) Patent No.: US 11,585,763 B2
(45) Date of Patent: Feb. 21, 2023

(54) LOW-COST DEVICE AND METHOD FOR MEASURING RADAR TRANSMISSION AND REFLECTANCE OF COATED ARTICLES

(71) Applicant: AXALTA COATING SYSTEMS IP CO., LLC, Wilmington, DE (US)

(72) Inventor: Neil Richard Murphy, Audubon, NJ (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 141 days.

(21) Appl. No.: 17/105,191

(22) Filed: Nov. 25, 2020

(65) Prior Publication Data

US 2022/0163462 A1     May 26, 2022

(51) Int. Cl.
| | |
|---|---|
| *G01N 22/00* | (2006.01) |
| *B05D 7/00* | (2006.01) |
| *G01S 13/88* | (2006.01) |
| *G01S 7/40* | (2006.01) |

(52) U.S. Cl.
CPC .............. *G01N 22/00* (2013.01); *B05D 7/54* (2013.01); *G01S 7/4039* (2021.05); *G01S 13/88* (2013.01)

(58) Field of Classification Search
CPC ...................................................... G01N 22/00
See application file for complete search history.

(56) References Cited

U.S. PATENT DOCUMENTS

| 3,025,463 A | 3/1962 | Luoma et al. | |
|---|---|---|---|
| 2015/0109162 A1* | 4/2015 | Binzer | H01Q 1/3233 |
| | | | 427/402 |

FOREIGN PATENT DOCUMENTS

| EP | 3581957 | * 12/2019 |
|---|---|---|
| EP | 3581957 A1 | 12/2019 |

* cited by examiner

*Primary Examiner* — Nathan T Leong
(74) *Attorney, Agent, or Firm* — Lorenz & Kopf, LLP

(57) ABSTRACT

Low-cost devices and methods for measuring radar transmission and/or reflectance of coated articles, as well as methods for forming coatings on articles are provided. An exemplary low-cost radar transmission and reflection measurement device includes a radar transmitter that emits a radar signal, a radar target to which the radar signal is directed, and a radar receiver that receives the radar signal. Further, the exemplary low-cost device includes a sample holder located between the radar transmitter and the radar target and between the radar target and the radar receiver. The sample holder receives a sample including a coating. The low-cost device also includes a controller connected to the radar transmitter and radar receiver. The controller measures a radar signal loss due to the coating.

20 Claims, 5 Drawing Sheets

LOW-COST DEVICE AND METHOD FOR MEASURING RADAR TRANSMISSION AND REFLECTANCE OF COATED ARTICLES

TECHNICAL FIELD

The technical field generally relates to devices and methods for measuring radar transmission and/or reflectance of coated articles, and more particularly relates to the testing of painted automotive panels.

BACKGROUND

Increasingly, radar sensors are installed and used in automobiles to aid operation of the automobile by the driver or to provide for self-driving operation. Automotive radar sensors are usually installed behind painted bumpers or painted body panels for purposes of aesthetics, aerodynamics, and/or to protect the radar sensors from environmental factors such as rain, snow, debris or wind. The radar sensors may be provided on the front, rear, corners, and sides of an automobile to provide for detecting other vehicles, pedestrians, stationary objects, signs, traffic control devices, or the like. Radar sensors may be deployed in automobiles as blind spot, lane change, collision avoidance, speed regulation, vehicle-following distance, and cross traffic assistants. Typically, a radar sensor includes a transmitter for emitting a radar signal and a receiver for detecting a reflected radar signal.

In order for the radar sensors to function reliably, the painted bumper or painted panel material covering the sensors must be sufficiently transparent to radar and homogeneous. If not, radar signals will not pass through as uniformly and unhindered as is necessary for safe operation of the automobile. It is known that the design, shape, and material of the bumper or body panel may negatively affect the phase and amplitude of both emitted and detected radar signals. Specifically, the range of radar detection may be reduced. Further, the angle accuracy of the detection of objects may be degraded. Such effects lead to unacceptable performance of the radar sensors.

Design and fabrication processes of articles such as bumpers and body panels may be sufficient in providing suitable radar transparency through uniformly produced substrates having acceptable designs, shapes and materials. However, processes for applying paints or other coatings, including basecoats, topcoats, clearcoats, and the like, to articles may result in variable coating thicknesses between different articles or even within the same article despite best practices. Certain coatings, such as metallic paints or paints including increased amounts of aluminum, exhibit increased levels of radar signal attenuation. Therefore, it may be imperative to ensure that such coatings do not interfere with radar transmission through bumpers or body panels before the bumpers or body panels are installed on automobiles for operation.

Accordingly, there is a need for the development of devices and methods for measuring radar transmission through, and reflectance from, coated articles such as automotive bumpers or body panels. Further, there is a need for low-cost devices for measuring radar transmission and reflectance. Also, there is a need for mobile devices for measuring radar transmission and reflectance of coated articles, such as handheld devices. Furthermore, other desirable features and characteristics will become apparent from the subsequent detailed description and the appended claims, taken in conjunction with the accompanying drawings and the foregoing technical field and background.

SUMMARY

Low-cost devices and methods for measuring radar transmission and/or reflectance of coated articles, as well as methods for forming coatings on articles are provided. An exemplary low-cost radar transmission and reflection measurement device includes a radar transmitter that emits a radar signal, a radar target to which the radar signal is directed, and a radar receiver that receives the radar signal. Further, the exemplary low-cost device includes a sample holder located at a prescribed distance between the radar transmitter and the radar target and between the radar target and the radar receiver. The sample holder receives a sample including a coating. The low-cost device also includes a controller connected to the radar transmitter and radar receiver. The controller measures a radar signal loss due to the coating.

In another embodiment, a method for measuring radar transmission through or reflectance from a coated article is provided. The exemplary method includes positioning the coated article in a sample holder of a device including a radar transmitter, a radar target, a radar receiver, and a controller connected to the transmitter and receiver. In the device, the sample holder is located at a prescribed distance between the radar transmitter and the radar target and between the radar target and the radar receiver. The method further includes directing a radar signal from the radar transmitter toward the radar target and receiving a portion of the radar signal with the radar receiver. The method also includes measuring a radar signal loss due to a coating on the coated article based on the portion of the radar signal received by the radar receiver.

In another embodiment, a method for forming a coating on an article is provided. The method includes applying a layer of a coating composition over the article. The method further includes measuring a radar signal loss due to the coating on the article by measuring radar transmission through and/or radar reflection from the article and the coating with a low-cost radar transmission and reflection measurement device comprising a radar transmitter, a radar target, and a radar receiver.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present embodiments will hereinafter be described in conjunction with the following drawing figures, wherein like numerals denote like elements, and wherein.

DETAILED DESCRIPTION

Figure 1:
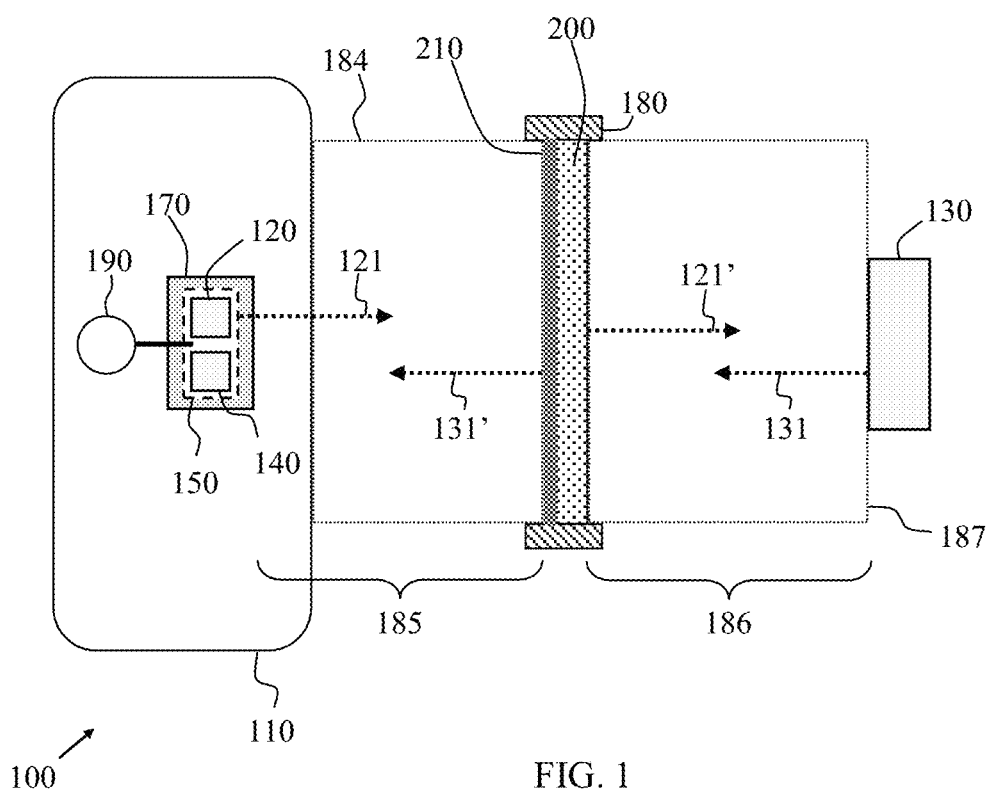
FIG. 1 is a schematic diagram of a device for measuring radar transmission through coated articles in accordance with exemplary embodiments.

The following detailed description is merely exemplary in nature and is not intended to limit the devices and methods as described herein. Furthermore, there is no intention to be bound by any theory presented in the preceding background or summary or in the following detailed description.

As used herein, "a," "an," or "the" means one or more unless otherwise specified. The term "or" can be conjunctive or disjunctive. Open terms such as "include," "including," "contain," "containing" and the like mean "comprising." In certain embodiments, numbers in this description indicating amounts, ratios of materials, physical properties of materials, and/or use are may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as being modified by the word "about" or may be understood as being not modified by the word "about". As used herein, the "%" or "percent" described in the present disclosure refers to the weight percentage unless otherwise indicated.

As noted above, error-free radar sensing of the area surrounding an automobile is important both for driver assistance and for autonomous driving. It is known that bumpers and body panels may impair the transmission of radar signals, such that obstacles are detected too late, in the wrong place, or not at all.

Radar transmission through articles, such as automotive components like bumpers and body panels, and through coatings, such as primer and/or adhesion promotor, basecoat, clearcoat and/or topcoat layers, is affected by article surface shape, article and coating thickness and compositional material. Specifically, different materials have different permittivity, which is a measure of a material's ability to be polarized by an applied electric field. Polarizability is related to the distortion of the electron cloud of the atoms comprising a given material when subjected to an applied electric field. High permittivity materials typically have poor radar transmission.

Exemplary articles such as bumpers and body panels may be injection molded from plastic in one piece and then coated with several very thin coating layers, such as paint. Inhomogeneous bumper material as well as too thick or unevenly applied paint layers can strongly attenuate the radar signal or change its transmission angle and prevent the radar sensors from functioning properly.

Exemplary bumpers and body panels are made of polymer blends with different types and ratios of fillers, such as carbon black and talc. Exemplary coatings include primary pigments, effect pigments such as metallic flake pigments, mica-containing pigments, glass-containing pigments and combinations thereof, functional pigments, as well as numerous additives that may cooperate to improve properties of the coating, such as anti-hangers, pH modifiers, catalysts, surface tension modifiers, solubility modifiers, adhesion promoters and combinations thereof. An exemplary coating layer of primer and/or adhesion promoter has a thickness of from about 4 to about 25 micrometers (µm). An exemplary coating layer of basecoat has a thickness of from about 10 to about 35 µm. An exemplary coating layer of clearcoat has a thickness of from about 25 to about 50 µm.

Exemplary metallic pigments may contain different shapes and sizes of metallic flakes depending on the desired visual effect. Metallic pigments are known to particularly inhibit radar transmission. Specifically, electrical susceptibility increases with increasing metal content in the coating layer.

Because an exemplary coated article described herein has multiple layers of coatings, reflection of a radar signal transmitted through the coated article is increased. Further, because each material may affect radar transmission, in particular when formed with varying thicknesses. Therefore, while design processing may attempt to predict the level of radar transmission through a finish coated article, such predictions may be unreliable due to myriad factors. Also, such predictions may be non-applicable to non-factory, repaired, and/or repainted articles.

As described herein, devices and methods for measuring radar transmission through and/or reflectance from coated articles are provided. Further, exemplary embodiments of such devices are low-cost, lightweight and mobile, such as being handheld, and methods are provided in which coatings are applied on articles and may be measured for radar transmission immediately. For example, radar transmission may be measured during the coating process, between steps of the coating process, immediately after completing the coating process, or during a downstream quality control process. For such methods, a radar transmission and reflectance measurement device may be used on-site at the coating location, such as in a painting chamber or booth.

Referring to FIG. 1, an exemplary device 100 for measuring radar transmission through coated articles is illustrated. An exemplary device 100 is lightweight, such as having a total weight of less than ten pounds (lbs), such as less than 5 lbs. As shown, an exemplary device 100 may include a housing 110. Further, the exemplary device 100 includes a radar transmitter 120 that emits a radar signal 121. An exemplary radar transmitter 120 emits a radar signal with a frequency of from about 76 to about 81 GHz, for example from about 77 GHz to about 79 GHz, such as at a frequency of 77 GHz or 79 GHz. In an exemplary embodiment, the radar transmitter 120 is mounted to the housing at a fixed location. As shown, the exemplary device 100 also includes a radar target 130 to which the radar signal 121 is directed. In an exemplary embodiment, the radar target 130 is mounted to the housing 110 at a fixed location. In the exemplary embodiment of FIG. 1, the radar target 130 is a radar reflector that reflects the radar signal 121 that reaches the radar reflector 130 in a transmission mode of the device 100. As shown, a reflected signal 131 is directed away from the radar target 130.

In FIG. 1, the device 100 further includes a radar receiver 140 that receives the reflected radar signal 131. In an exemplary embodiment, the radar receiver 140 is mounted to the housing 110 at a fixed location. As may be understood, the radar receiver 140 and the radar reflector 130 are aligned so that the reflected signal 131 is directed at the radar receiver 140. While illustrated as two separate elements, it is contemplated that the radar transmitter 120 and the radar receiver 140 be included or contained in a single radar transceiver unit 150 capable of transmitting and receiving radar signals. In an exemplary embodiment, the radar transceiver unit 150 is mounted to the housing 110 at a fixed location. In certain exemplary embodiments, the device 100 includes an adjustable frame 170 that holds the radar transmitter 120 and radar receiver 140, or transceiver unit 150, at a selected position on the housing 110.

As shown, the exemplary device 100 further includes an external sample holder 180. In the illustrated exemplary embodiment, the sample holder 180 is located between the radar transmitter 120 and the radar target 130. Further, in the illustrated exemplary embodiment, the sample holder 180 is located between the radar target 130 and the radar receiver 140. An exemplary sample holder 180 may include a frame and/or arms for holding an article 200 to be tested by the device 100. In certain embodiments, the sample holder 180 is mounted to the housing 110 at a fixed location. In certain embodiments, the location of the sample holder 180 relative to the housing 110 is adjustable to position the article 200 to be tested at a desirable location and angle relative to the radar transmitter 120, radar target 130, and/or radar receiver 140 for optimal radar transmission.

While not part of the device 100, the article 200 is illustrated in FIG. 1. An exemplary article 200 includes a coating 210. An exemplary coating 210 may include a single coating layer or a plurality of layers. For example, the coating 210 may include one or more primer or adhesion promotor, basecoat, clearcoat, and/or topcoat layers, and such layers may include primary pigments, effect pigments such as metallic flake pigments, mica-containing pigments, glass-containing pigments and combinations thereof, functional pigments, and additives.

An exemplary article 200 is an automotive part, such as a bumper or body panel. Exemplary articles 200 are comprised of polymer blends with different types and ratios of fillers. Such articles 200 may vary widely in size and shape and an exemplary sample holder 180 may include grasping, frictional, or other functional elements to hold the article 200 in the desired position. Further, while the location of the exemplary sample holder 180 may be adjustable, an exemplary sample holder 180 is adjustable itself to position the article 200 to be tested at a desirable location and angle relative to the radar transmitter 120, radar target 130, and/or radar receiver 140.

In FIG. 1, the article 200 is distanced from the radar transmitter 120 and radar receiver 140 by a gap 185. In certain embodiments, gap 185 is an air gap. Further, the article 200 is distanced from the radar reflector 130 by a gap 186. In certain embodiments, gap 186 is an air gap. In exemplary embodiments, gaps 185 and 186 are formed by a solid structure 184 and 187, such as a spacer or mechanical fixture that does not impede radar signal path, having a known radar transmission properties. In exemplary embodiments, the article 200 may be positioned on the device 100 to abut the spacer 187.

As further shown, the exemplary device 100 includes a controller 190. The exemplary controller 190 is connected to the radar transmitter 120 and radar receiver 140. The controller 190 is configured to measure a radar signal loss due to the coating 210 on the article 200. The controller 190 may also perform software-implemented calibration of the incident radar signal in order to compensate for geometry or environment-induced measurement error. An exemplary controller 190 includes a circuit board. The controller 190 may utilize techniques, technologies and functions that may be performed by various computing components or devices. Such operations, tasks, and functions are sometimes referred to as being computer-executed, computerized, software-implemented, or computer-implemented. It should be appreciated that the illustrated controller 190 may be realized by any number of hardware, software, and/or firmware components configured to perform the specified functions. For example, an embodiment of a controller 190 may employ various integrated circuit components, e.g., memory elements, digital signal processing elements, logic elements, look-up tables, or the like, which may carry out a variety of functions under the control of one or more microprocessors or other control devices.

The device 100 of FIG. 1 may provide for testing the coated article 200 in a transmission mode, i.e., the transmission of a radar signal through the coated article 200 is measured.

Figure 2:
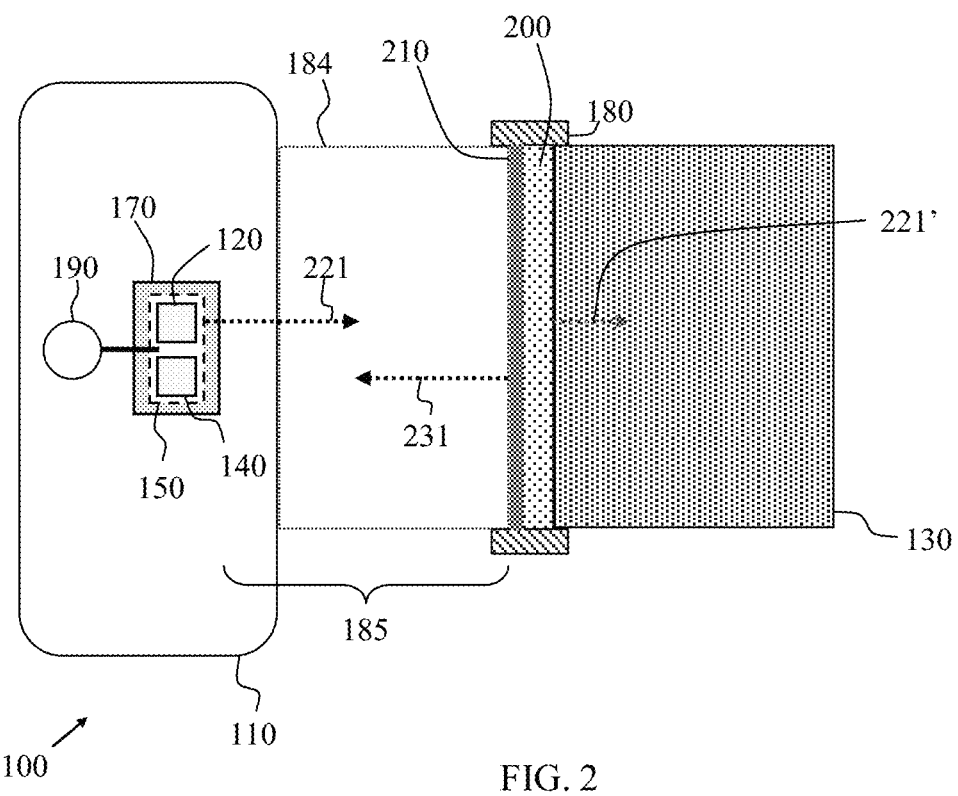
FIG. 2 is a schematic diagram of a device for measuring radar reflectance from coated articles in accordance with exemplary embodiments.

FIG. 2 illustrates an embodiment for testing a coated article 200 in a reflection mode. As shown in FIG. 2, a lightweight device 100 again includes a housing 110, a radar transmitter 120 mounted to the housing 110 and a radar receiver 140 mounted to the housing 110, wherein the radar transmitter 120 and radar receiver 140 may in included in an integral radar transceiver unit 150 mounted to the housing. As shown, the radar transmitter 120 and radar receiver 140 are coupled to a controller 190 that controls operation of the device 100 as described above. Further, the radar transmitter 120 and radar receiver 140 may be mounted to an adjustable frame 170 that holds the radar transmitter 120 and radar receiver 140, or transceiver unit 150, at a selected position on the housing 110.

In FIG. 2, the device 100 includes a radar target 130 that is a radar absorber. An exemplary radar absorber is a carbon foam or lossy foam absorber, though any suitable low-cost, lightweight material may be used provided that the radar absorber absorbs the radar signal that reaches the radar absorber during operation in a reflection mode of the device 100.

As shown, the exemplary device 100 further includes a sample holder 180. In the illustrated exemplary embodiment, the sample holder 180 is located between the radar transmitter 120 and the radar target 130. Further, in the illustrated exemplary embodiment, the sample holder 180 is located between the radar target 130 and the radar receiver 140. Again, the exemplary sample holder 180 may include a frame and/or arms for holding an article 200 with a coating 210 to be tested by the device 100. In certain embodiments, the sample holder 180 is mounted to the housing 110 at a fixed location. In certain embodiments, the location of the sample holder 180 relative to the housing 110 is adjustable to position the article 200 to be tested at a desirable location and angle relative to the radar transmitter 120, radar target 130, and/or radar receiver 140 for optimal radar transmission. In an exemplary embodiment, the sample holder 180 holds the coated article 200 such that the coated article abuts the radar absorber 130. As shown, the coated article 200 is separated from the radar transmitter 120 and radar receiver 140 by a gap 185, such as an air gap.

As shown in FIG. 2, during operation, a radar signal 221 is emitted from the radar transmitter 120. A portion 231 of the radar signal is reflected by the coating 210 on the article 200 and is received by the radar receiver 140. The controller 190 interrogates the received signal 231 to measure the radar reflectance by the coating 210.

Figure 3:
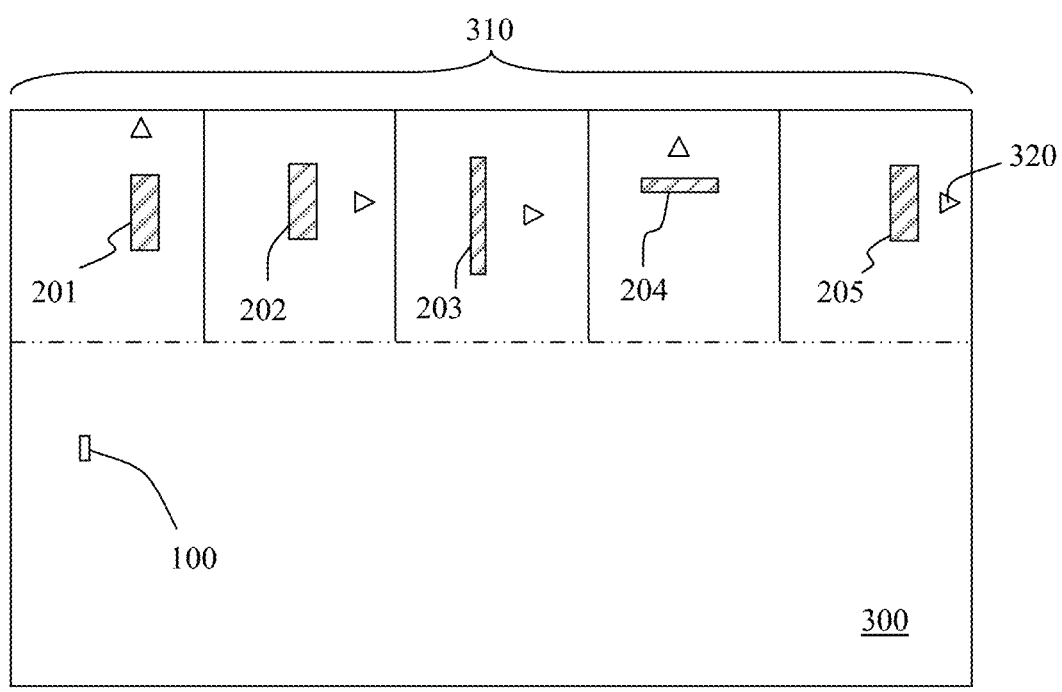
FIG. 3 is a schematic diagram of a location for coating articles and for measuring radar transmission and/or reflectance in accordance with exemplary embodiments.

FIG. 3 provides a schematic overhead view of a paint location 300, such as an autobody shop, having a plurality of painting chambers, booths or bays 310. As shown, articles 201, 202, 203, 204, and 205 are located in each painting chamber 310. The articles 201-205 may be coated or in the process of being coated by coating applicators 320. In exemplary embodiments, the articles 201-205 are automotive bumpers or body panels.

As shown, a mobile lightweight low-cost radar transmission and reflection measurement device 100 is provided at the paint location 300. During use, the device 100 may be carried into a respective painting chamber 310 to measure a respective coated article 201-205. Further, the device 100 may be used to measure a respective coated article 201-205 during the painting process, such as during or between painting and/or drying/curing stages.

Because the device 100 is mobile and lightweight and can be transported into the painting chambers 310, coated articles 201-205 need not be moved out of the painting chambers 310 for testing.

Figure 4:
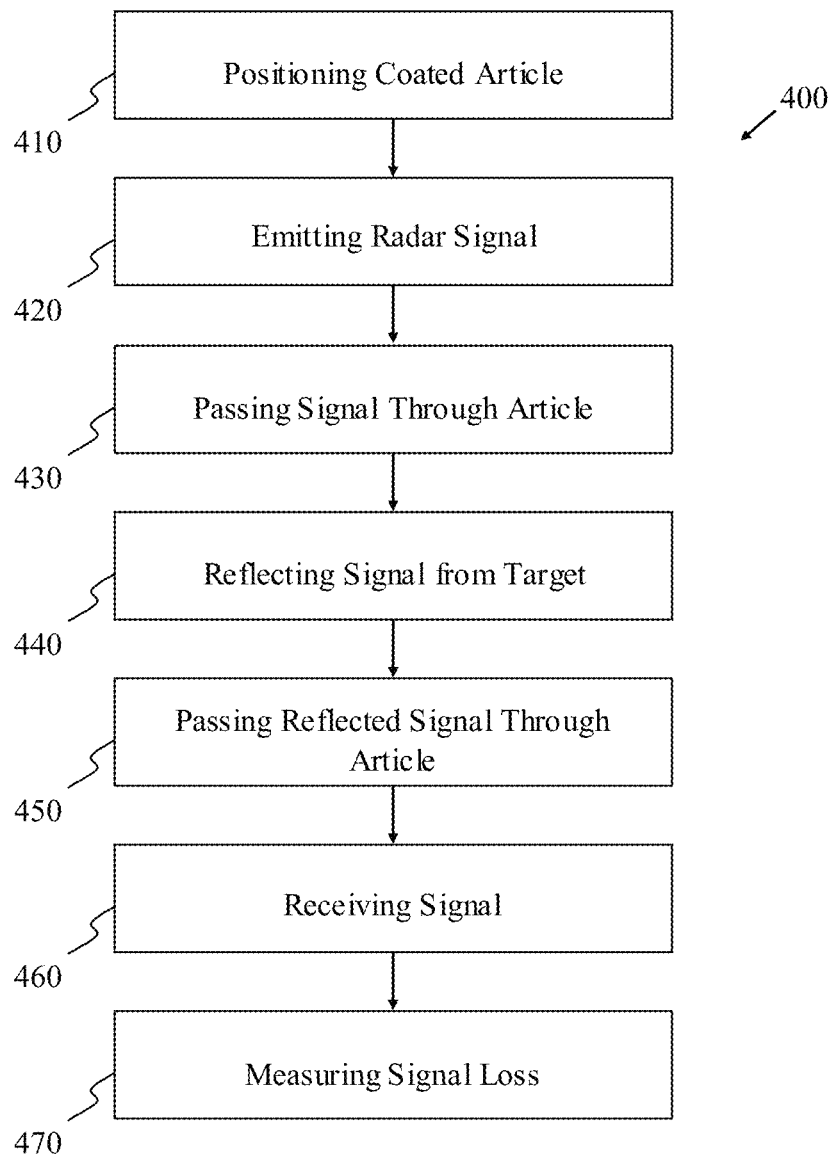
FIG. 4 is a flow chart illustrating a method for measuring radar transmission through a coated article in accordance with exemplary embodiments.

FIG. 4 is a flow chart for a method 400 for measuring radar transmission through a coated article with the device 100 of FIG. 1 in a radar transmission mode. Cross-referencing FIGS. 1 and 4, the method 400 includes, at action block 410, positioning the coated article 200 at a desired location and orientation with respect to the radar transmitter 120, radar target/reflector 130, and radar receiver 140. For example, the coated article 200 may be positioned in the sample holder 180 of the device 100. Positioning the coated article at the desired location and orientation may include adjusting the position of the radar transmitter and radar receiver with respect to the housing.

The method 400 further includes emitting and directing a radar signal 121 from the radar transmitter 120 toward the radar target 130 at action block 420. The method 400 includes transmitting, or passing a transmitted portion 121' of, the radar signal 121 through the coating 210 and article 200 at action block 430. Portions of the radar signal 121 may be reflected or otherwise lost when passing through the coating 210 and article 200.

The exemplary method 400 further includes, at action block 440, reflecting the transmitted portion 121' of the radar signal that reaches the radar target/reflector 130 to form a reflected signal 131. As shown, the reflected signal 131 is directed back toward the radar receiver 140 through the coated article 200.

At action block 450, the method 400 includes transmitting, or passing a transmitted portion 131' of, the reflected radar signal 131 through the coated article 200. As indicated in FIG. 4, the method 400 includes receiving the transmitted portion 131' of the reflected radar signal 131 with the radar receiver 140 at action block 460.

At action block 470, the method includes measuring a radar signal loss due to a coating 210 on the coated article 200 based on the transmitted portion 131' of the reflected radar signal 131 received by the radar receiver 140. The processing of action block 470 may be performed by the controller 190 of the device 100 and may include comparing the received portion 131' to the emitted signal 121 and/or to a library of received signals that were transmitted through articles with known levels of radar transmission and reflectance effects.

Figure 5:
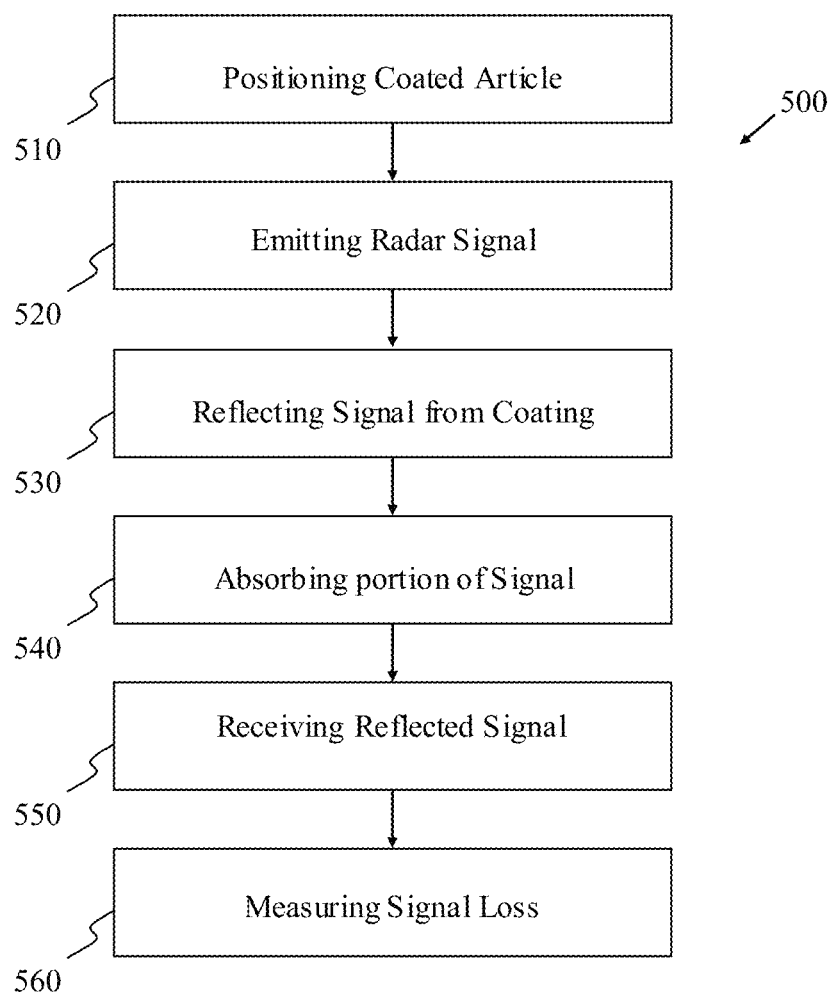
FIG. 5 is a flow chart illustrating a method for measuring radar reflectance from a coated article in accordance with exemplary embodiments.

FIG. 5 is a flow chart for a method 500 for measuring radar transmission through a coated article with the device 100 of FIG. 2 in a radar reflection mode. Cross-referencing FIGS. 2 and 5, the method 500 includes, at action block 510, positioning the coated article 200 at a desired location and orientation with respect to the radar transmitter 120, radar target/absorber 130, and radar receiver 140. For example, the coated article 200 may be positioned in the sample holder 180 of the device 100. Positioning the coated article at the desired location and orientation may include adjusting the position of the radar transmitter and radar receiver with respect to the housing.

The method 500 further includes emitting and directing a radar signal 221 from the radar transmitter 120 toward the radar target 130 at action block 520. The method 500 includes reflecting a portion of the radar signal 221 off of the coating 210 to form a reflected signal 231 at action block 530. As shown, the reflected signal 231 is directed back toward the radar receiver 140. Further, the method 500 includes absorbing a portion 221' of the radar signal 221, which passes through the coated article 200 and reaches the radar absorber 130, with the radar absorber 130 at action block 540.

At action block 550, the method includes measuring a radar signal loss due to the coating 210 on the coated article 200 based on the reflected signal 231 received by the radar receiver 140. The processing of action block 550 may be performed by the controller 190 of the device 100 and may include comparing the reflected signal 231 to the emitted signal 221 and/or to a library of received signals that were transmitted through articles with known levels of radar transmission and reflectance effects.

It is noted that the device 100 as described in relation to the transmission mode of FIGS. 1 and 4 and the reflectance mode of FIGS. 2 and 5 may operate in two further modes: contact and non-contact (where the components of the device 100 are set a certain distance from the coated article). In a non-contact configuration, the device 100 can measure the properties of a coating during drying or curing, or after during/drying and before application of an additional layer.

Figure 6:
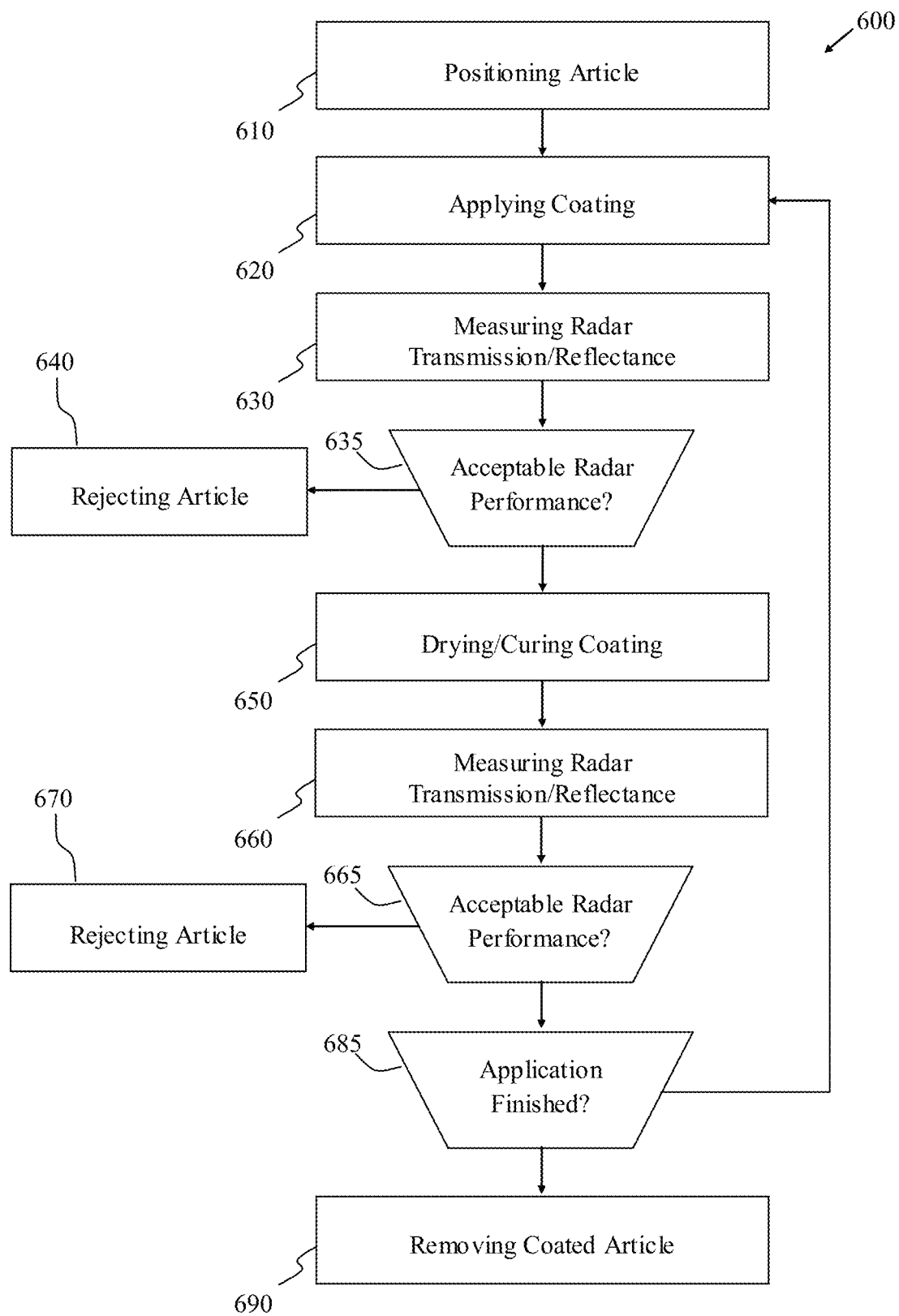
FIG. 6 is a flow chart illustrating a method for applying a coating to an article in accordance with exemplary embodiments.

As noted above, the methods 400 and/or 500 may be used as techniques or processes during a coating method. For example, FIG. 6 illustrates a method 600 for applying a coating to an article. Cross-referencing FIG. 3 and FIG. 6, the method 600 includes positioning the article 200 in a painting chamber 310 at action block 610. Further, the method 600 includes applying a coating to the article 200, such as with a coating applicator 320. The method 600 may also include measuring the radar transmission and/or reflection of the coating applied to the article at optional action block 630. The measuring process of action block 630 may be performed during or after the coating application of action block 620. In exemplary embodiments, the measuring process of action block 630 occurs without removing the article 200 from the painting chamber 310, i.e., the device 100 is carried into the painting chamber 310.

The method 600 ascertains whether the radar performance of the coating is acceptable at query 635. If no, the article is rejected at action block 640. For example, the coating may be removed or the coating application otherwise adjusted so that only coated articles with acceptable radar performance are produced by the method 600.

If the radar performance is accepted, the method 600 may continue with drying and/or curing the coating at action block 650. The method 600 may also include measuring the radar transmission and/or reflection of the coating applied to the article at optional action block 660. The measuring process of action block 660 may be performed during or after the drying and/or curing process of action block 650. In exemplary embodiments, the measuring process of action block 660 occurs without removing the article 200 from the painting chamber 310, i.e., the device 100 is carried into the painting chamber 310.

The method 600 ascertains whether the radar performance of the coating is acceptable at query 665. If no, the article is rejected at action block 670. For example, the coating may be removed or the coating application otherwise adjusted so that only coated articles with acceptable radar performance are produced by the method 600.

If the radar performance is accepted, the method 600 may continue with ascertaining whether the application is finished, i.e., no more coating layers are to be applied, at query 685. If the application is not finished, then the method returns to and continues from action block 620 for the application of another coating layer. If the application is finished, then the method may include removing the coated article from the painting booth at action block 690.

As described, methods may be utilized to apply and evaluate applied coatings on newly manufactured articles or on repaired or replacement articles. In case of an OEM coating process the article is typically one made by a serial production process. Automotive plastics articles may be uncoated or they may have a precoating like a conductive primer layer or, an original coating to be repaired.

While the method 600 provides for measuring radar transmission and/or reflectance at the time of coating an article, it is also contemplated that the methods of FIGS. 4 and/or 5 may be performed downstream of the coating application, such as during a quality check or before installation on a vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for measuring radar transmission and/or reflectance of a coated article, the method comprising:
    positioning the coated article in a sample holder of a device further comprising:
        a radar transmitter physically interconnected with the sample holder;
        a radar target physically interconnected with the sample holder and radar transmitter;
        a radar receiver physically interconnected with the sample holder, radar transmitter, and the radar target, wherein the sample holder is located between the radar transmitter and the radar target and between the radar target and the radar receiver; and
        a controller connected to the radar transmitter and radar receiver;
    directing a radar signal from the radar transmitter toward the radar target;
    receiving a portion of the radar signal with the radar receiver; and
    measuring a radar signal loss due to a coating on the coated article based on the portion of the radar signal received by the radar receiver.

2. The method of claim 1 wherein the radar target comprises a radar reflector, and wherein the method further comprises reflecting the radar signal that reaches the radar reflector in a transmission mode of the device.

3. The method of claim 1 wherein the radar target comprises a radar absorber, and wherein the method further comprises absorbing the radar signal that reaches the radar absorber in a reflection mode of the device.

4. The method of claim 1 wherein the device further comprises a housing, wherein the radar transmitter, radar target, radar receiver and sample holder are mounted to the housing.

5. The method of claim 1 wherein the device further comprises a housing and an adjustable frame that holds the radar transmitter and radar receiver, wherein the method comprises adjusting a position of the radar transmitter and radar receiver with respect to the housing.

6. The method of claim 1 wherein directing the radar signal from the radar transmitter toward the radar target comprises directing the radar signal with a frequency of from about 76 to about 81 GHz.

7. The method of claim 1 wherein the coated article is an automotive part.

8. The method of claim 1 wherein the device has a total weight of less than five pounds and wherein positioning the coated article in the sample holder of the device comprises carrying the device to the coated article.

9. The method of claim 1 wherein positioning the coated article in the sample holder of the device, directing the radar signal from the radar transmitter toward the radar target, receiving the portion of the radar signal with the radar receiver, and measuring the radar signal loss due to the coating on the coated article based on the portion of the radar signal received by the radar receiver comprises operating the device in a non-contact mode before or during drying or curing of the coating in which components of the device are set a non-contact distance from the coated article while measuring the radar signal loss.

10. The method of claim 1 wherein the coated article is distanced from the radar transmitter and the radar receiver by an air gap.

11. The method of claim 1 wherein a solid spacer with known radar transmission properties is located between the coated article and the radar transmitter and radar receiver, and wherein the coated article abuts the solid spacer.

12. A method for forming a coating on an article, the method comprising:
    applying a layer of a coating composition over the article in a painting booth;
    carrying a handheld radar transmission and reflection measurement device into the painting booth, wherein the handheld radar transmission and reflection measurement device has a total weight of less than ten pounds, and wherein the handheld radar transmission and reflection measurement device comprises a radar transmitter, a radar target, and a radar receiver; and
    measuring a radar signal loss due to the coating on the article by measuring radar transmission through and/or radar reflection from the article and the coating with the handheld radar transmission and reflection measurement device.

13. The method of claim 12 further comprising:
    applying an additional coating over the layer after measuring the radar signal loss; and
    measuring a radar signal loss due to the additional coating on the article by measuring radar transmission through and/or radar reflection from the article and the additional coating with the low-cost radar transmission and reflection measurement device.

14. The method of claim 13 further comprising:
determining that the radar signal loss due to the additional coating on the article is acceptable;
ascertaining that no more coating layers are to be applied;
removing the coated article from the painting booth.

15. The of claim 12 wherein, after applying the layer of the coating composition over the article, the article is not removed from the painting chamber before or when measuring the radar signal loss due to the coating on the article.

16. The method of claim 12 wherein measuring radar transmission through and/or radar reflection from the article and the coating with the handheld radar transmission and reflection measurement device comprises operating the handheld radar transmission and reflection measurement device in a non-contact mode before or during drying or curing of the coating in which components of the device are set a non-contact distance from the article while measuring the radar transmission through and/or radar reflection from the article and the coating.

17. The method of claim 12 wherein the radar transmitter, radar target, radar receiver and sample holder are mounted to a device housing.

18. The method of claim 12 wherein the article is distanced from the radar transmitter and the radar receiver by an air gap.

19. The method of claim 12 wherein a solid spacer with known radar transmission properties is located between the article and the radar transmitter and radar receiver, and wherein the article abuts the solid spacer.

20. A method for measuring radar transmission and/or reflectance of coated articles, the method comprising:

providing a handheld device comprising physically interconnected components including a sample holder, a radar transmitter, a radar target, and a radar receiver, wherein the sample holder is located between the radar transmitter and the radar target and between the radar target and the radar receiver;

carrying the handheld device to a first coated article located in a first painting booth;

positioning the first coated article in the sample holder of the device;

directing a radar signal from the radar transmitter toward the radar target;

receiving a portion of the radar signal with the radar receiver;

measuring a radar signal loss due to a coating on the coated article based on the portion of the radar signal received by the radar receiver;

carrying the handheld device to a second coated article located in a second painting booth;

positioning the second coated article in the sample holder of the device;

directing a radar signal from the radar transmitter toward the radar target;

receiving a portion of the radar signal with the radar receiver; and measuring a radar signal loss due to a coating on the second coated article based on the portion of the radar signal received by the radar receiver.

* * * * *